United States Patent
Tsuruta et al.

(10) Patent No.: US 7,389,592 B2
(45) Date of Patent: Jun. 24, 2008

(54) LEAN DETECTOR OF VEHICLE

(75) Inventors: Yuichiro Tsuruta, Saitama (JP); Toru Iwadate, Saitama (JP); Yusuke Funayose, Saitama (JP); Yuichi Morino, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/392,712

(22) Filed: Mar. 30, 2006

(65) Prior Publication Data

US 2006/0218808 A1    Oct. 5, 2006

(30) Foreign Application Priority Data

Mar. 31, 2005    (JP) .............................. 2005-102502

(51) Int. Cl.
*G01C 9/06*    (2006.01)
(52) U.S. Cl. .................................... 33/366.16; 33/355 R
(58) Field of Classification Search ............. 33/366.11, 33/366.13, 366.15, 366.18, 366.24, 355 R, 33/300, 365, 391, 333; 340/439, 440, 441; 701/116, 124
See application file for complete search history.

(56) References Cited

U.S. PATENT DOCUMENTS

| | | | | |
|---|---|---|---|---|
| 1,085,608 A | * | 2/1914 | Heath ...................... 200/61.51 |
| 3,772,643 A | * | 11/1973 | Dodd et al. .................. 340/440 |
| 4,788,773 A | * | 12/1988 | Palsgard et al. ................ 33/333 |
| 5,032,821 A | * | 7/1991 | Domanico et al. ........... 340/440 |
| 5,532,672 A | * | 7/1996 | Plazarin ...................... 340/440 |
| 5,857,535 A | * | 1/1999 | Brooks ......................... 180/41 |
| 6,527,077 B2 | * | 3/2003 | Yamamoto et al. ........... 340/440 |
| 7,017,701 B2 | * | 3/2006 | Flynn et al. .................. 180/282 |
| 2005/0033549 A1 | * | 2/2005 | Clark .......................... 701/124 |
| 2005/0275516 A1 | * | 12/2005 | Lang ........................... 340/440 |
| 2006/0137199 A1 | * | 6/2006 | Ikuta ........................ 33/366.24 |
| 2007/0045028 A1 | * | 3/2007 | Yamamoto et al. ........... 180/282 |
| 2007/0051001 A1 | * | 3/2007 | Hasegawa et al. ......... 33/366.24 |

FOREIGN PATENT DOCUMENTS

| | | | |
|---|---|---|---|
| DE | 4217247 A1 | * | 10/1992 |
| JP | 61084514 A | * | 4/1986 |
| JP | 61144505 A | * | 7/1986 |
| JP | 61155913 A | * | 7/1986 |
| JP | 05124543 A | * | 5/1993 |
| JP | 8-133155 A | | 5/1996 |

* cited by examiner

*Primary Examiner*—G. Bradley Bennett
(74) *Attorney, Agent, or Firm*—Birch, Stewart, Kolasch & Birch, LLP

(57) ABSTRACT

A lean detector for a vehicle is capable of reducing the cost of the parts of a lean sensor and enhancing the waterproof property thereof. The lean detector also detects when the leaning of the vehicle body has reached a prescribed angle in the right, left, front or rear direction. The lean sensor is installed at a position above a bottom end of a baseplate of the seat of a saddle-ride type four-wheeled vehicle.

20 Claims, 8 Drawing Sheets

LEAN DETECTOR OF VEHICLE

CROSS-REFERENCE TO RELATED APPLICATIONS

This nonprovisional application claims priority under 35 U.S.C. § 119(a) on Patent Application No. 2005-102502, filed in Japan on Mar. 31, 2005, the entirety of which is incorporated herein by reference.

BACKGROUND OF THE INVENTION

1. Field of the Invention

The present invention relates to a lean detector for a vehicle. In particular, the present invention relates to a lean sensor that can detect leaning of a vehicle body.

2. Description of Background Art

It is known to detect a banking angle (inclination angle in the right or left direction) of a motorcycle body by installing a lean sensor at a lower part of the vehicle body (see, for example, Japanese Patent Application Laid-Open No. Hei. 8-133155).

It sometimes happens that a vehicle that is used for traveling on rough terrain, such as an All Terrain Vehicle (ATV), also uses a lean sensor to detect that the leaning of the vehicle body in the right or left direction has reached a prescribed angle and carry out a prescribed engine control (stop of ignition, stop of fuel injection and the like) in response thereto.

In such a vehicle, when traveling with a lower part of the vehicle body dipped in water, in the case of the above configuration according to the background art, the waterproof property of the lean sensor must be enhanced. This enhancement can increase the cost of the lean sensor.

Furthermore, in the above vehicle, it is desirable to detect the leaning of the vehicle body that has reached a prescribed angle in the right and left directions and in the front and rear directions. However, it is not preferable to add another lean sensor for that purpose because that increases the costs of the vehicle.

SUMMARY OF THE INVENTION

In view of the above situation, the present invention provides a lean detector for a vehicle that decreases the cost of the parts of the lean sensor. Furthermore, the lean detector of the present invention enhances the waterproof property thereof and detects whether the vehicle body has leaned in the right, left, front or rear direction to a prescribed angle.

A first aspect of the present invention is directed to a lean detector for a vehicle (for example, the saddle-ride type four-wheeled vehicle 1 in the embodiment). The vehicle is provided with: an engine (for example, the engine 5 in the embodiment) supported by a vehicle body frame (for example, the vehicle body frame 4 in the embodiment); a steering shaft (for example, the steering shaft 25 in the embodiment) supported by the vehicle body frame through a handle stem (for example, the handle stem 43 in the embodiment); a fuel tank (for example, the fuel tank 22 in the embodiment) above the engine; an air cleaner box (for example, the air cleaner box 18 in the embodiment) to the rear of the engine; a fuel injector (for example, the injector 17a in the embodiment) between the engine and the air cleaner box; and a seat (for example, the seat 23 in the embodiment) to the rear of the fuel tank and above the air cleaner box. The lean sensor is disposed (for example, the lean sensor 61 in the embodiment) to detect the leaning of the vehicle body at a position above a bottom end of a baseplate (for example, the baseplate 23a in the embodiment) of the seat.

With this configuration, the lean sensor is hardly immersed in water when the lower part of the vehicle body is dipped in water. Therefore, it is possible to decrease the cost of the parts of the lean sensor, further enhance the waterproof property thereof, and realize good engine control.

According to a second aspect of the present invention, the lean sensor has a space (for example, the space 65A in the embodiment) of a U-shaped contour and a swinging float (for example, the float 63 in the embodiment) pivoted near the center of the interior of the space. Magnet components (for example, the magnets 71 in the embodiment) are provided at both swing ends of the float. Detection sections (for example, the magnetic sensors 72 in the embodiment) are provided to detect that the magnet components, together with the float, have swung up to a prescribed detection angle at the ends of the space. When the float swings up to the detection angle for a prescribed time period, it is detected that the vehicle body is leaning at a prescribed angle.

With this configuration, when the float temporarily swings up to the aforementioned detection angle by a centrifugal force during turning or the like in the case of a vehicle traveling on rough terrain that has a relatively small banking angle, it is possible to prevent the lean sensor from wrongly judging the leaning of the vehicle body and realize good engine control.

Furthermore, even though the lean sensor is a sensor that detects the leaning of the vehicle body in the right and left directions, when the vehicle body leans in the front and rear directions, as long as the leaning angle is not less than 90 degrees, the possibility that the float leans in either of the right or left direction by the vibration of the engine or the like increases. That is, when the vehicle body leans at an angle larger than 90 degrees in the front and rear directions, the float leans in either of the right or left direction without fail. When the swinging caused by the leaning reaches the aforementioned detection angle for a prescribed time period, it is possible to detect that the leaning of the vehicle body in the front and rear directions is at a prescribed angle and carry out engine control broadly conforming to the leaning of the vehicle body.

According to a third aspect of the present invention, the vehicle is a rough terrain traveling four-wheeled vehicle and the prescribed time period is set at a time period longer than the time period during which the float reaches the detection angle during turning travel of the rough terrain traveling four-wheeled vehicle.

With this configuration, in the rough terrain traveling four-wheeled vehicle having a vehicle body that does not bank while turning, even when the float of the lean sensor swings temporarily up to the aforementioned detection angle by the centrifugal force during turning, it is possible to prevent the wrong judgment that the leaning angle of the vehicle body has reached a prescribed angle.

According to the first aspect of the present invention, it is possible to enhance the waterproof property of the lean sensor while suppressing the increase of the cost of the lean sensor parts.

According to the second aspect of the present invention, it is possible to prevent the lean sensor from wrongly recognizing the leaning of the vehicle body and detect that the leaning of the vehicle body in the right, left, front or rear directions is at a prescribed angle.

According to the third aspect of the present invention, it is possible to prevent the lean sensor from wrongly recognizing the leaning of the vehicle body during turning of the rough terrain traveling four-wheeled vehicle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
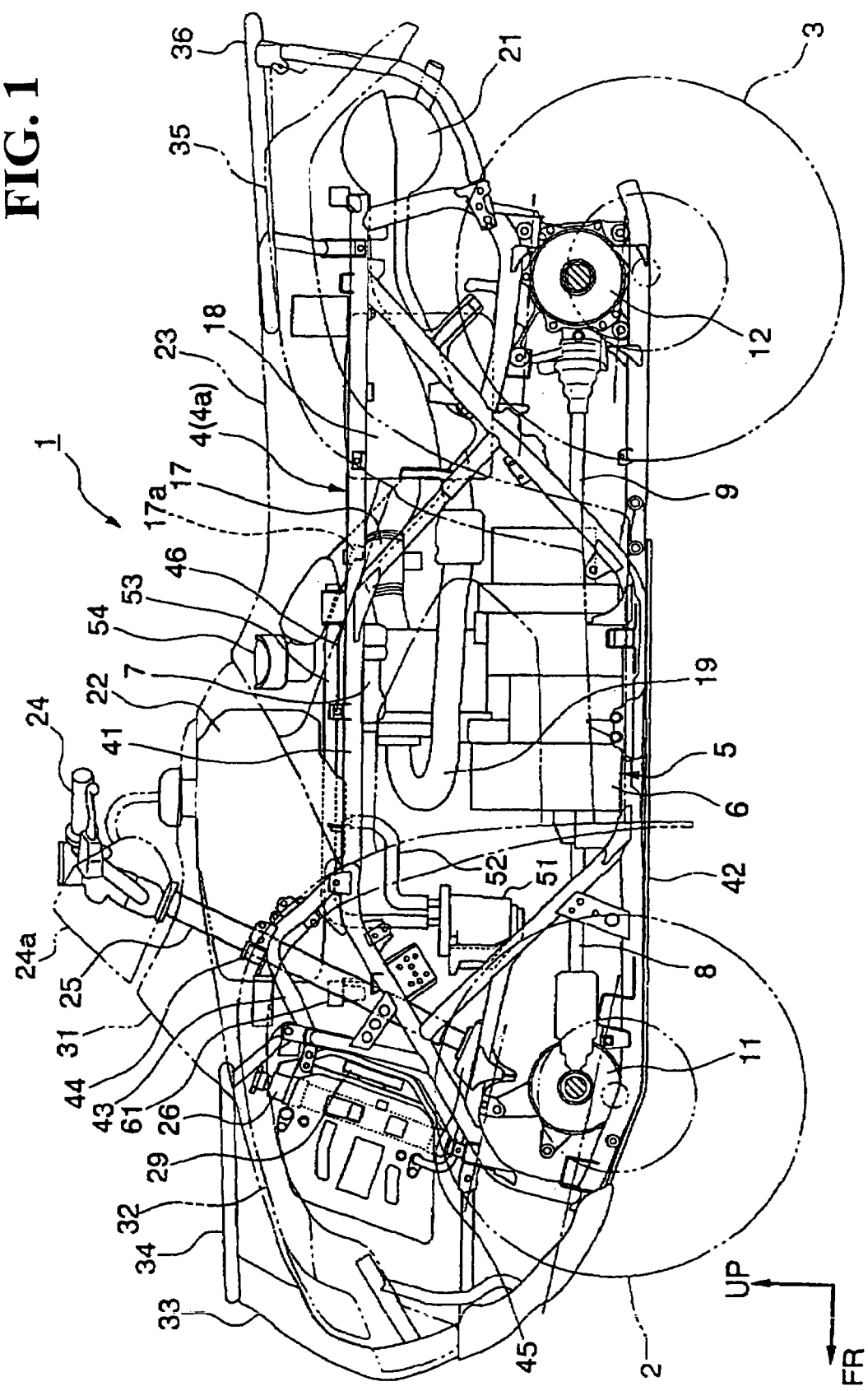
FIG. 1 is a side view of a saddle-ride type four-wheeled vehicle according to an embodiment of the present invention.

The present invention will now be described with reference to the accompanying drawings, wherein the same or similar elements will be identified with the same reference numerals. In the below description, it is assumed that the front and rear, right and left directions are with respect to the traveling direction of the vehicle unless otherwise specified. Furthermore, the arrow FR in the figures shows the front direction of the vehicle, the arrow LH the left direction of the vehicle, and the arrow UP the upper direction of the vehicle.

A saddle-ride type four-wheeled vehicle for example, a rough terrain traveling four-wheeled vehicle) 1 shown in FIG. 1 is a so-called ATV (All Terrain Vehicle) that is equipped with a pair of right and left front wheels 2 and another pair of right and left rear wheels 3. The wheels are low pressure balloon tires having a relatively large diameter in the front and rear of the vehicle body and are configured so as to be small and lightweight. This secures a large minimum ground clearance and an improved operation of the vehicle on rough terrain.

An engine 5 as the prime mover of the saddle-ride type four-wheeled vehicle 1 is disposed at a position nearly in the center of a vehicle body frame 4. The engine 5 is a single cylinder engine of a water cooling type. The engine is disposed on a longitudinal layout so that a crank shaft is placed in the front and rear direction. A crank case 6 that composes the lower part of the engine 5 also has the function as a transmission case. Propeller shafts 8 and 9 extend in the front and rear directions from the front and rear of the crank case 6, respectively.

The propeller shafts 8 and 9 are connected to the front wheels 2 and rear wheels 3 in a power-transmittable manner through a front wheel power mechanism 11 and a rear wheel power mechanism 12 at the front and rear of the vehicle body frame 4, respectively. The front wheels 2 and rear wheels 3 are suspended in the front and rear of the vehicle body frame 4 with suspension systems not shown in the figure, respectively.

The saddle-ride type four-wheeled vehicle 1 adopts an electronically controlled fuel injection system in the fuel feed system to the engine 5. A throttle body 17 having an injector (fuel injector) 17a is connected to the rear part of a cylinder 7 disposed on the crank case 6 of the engine 5. Furthermore, an air cleaner box 18 located under the rear part of a seat 23 is connected to the rear part of the throttle body 17. The base end of an exhaust pipe 19 is connected to the front part of the cylinder 7. The exhaust pipe 19 extends toward the front of the cylinder 7 and thereafter is bent backward, and the tip thereof is connected to a silencer 21 disposed at the rear part of the vehicle body.

In the center of the vehicle width above the body of the saddle-ride type four-wheeled vehicle 1, a steering shaft 25, a fuel tank 22, and a saddle-ride type seat 23 are disposed starting from the front. The bottom end of the steering shaft 25 is connected to a front wheel steering mechanism (not shown in the figure) and a bar-shaped handle 24 having right and left grips is attached to the top end of the steering shaft 25. The vicinity of a holder to fix the handle 24 to the steering shaft 25 is covered with a handle cover 24a made of resin. A radiator 26, having a motor-driven fan 29, to cool the engine 5 is disposed in front of the lower part of the steering shaft 25.

A vehicle body cover 31 made of resin that covers the front part of the vehicle body including the fuel tank 22, a front fender 32 made of resin that likewise covers the front wheels 2 from above to the rear side, and a front protector 33 and a front carrier 34 mainly made of steel pipes are attached to the front part of the vehicle body frame 4. Furthermore, a rear fender 35 made of resin that covers the rear wheels 3 from above to the front side and a rear carrier 36 mainly made of a steel pipe are attached to the rear part of the vehicle body frame 4.

Figure 2:
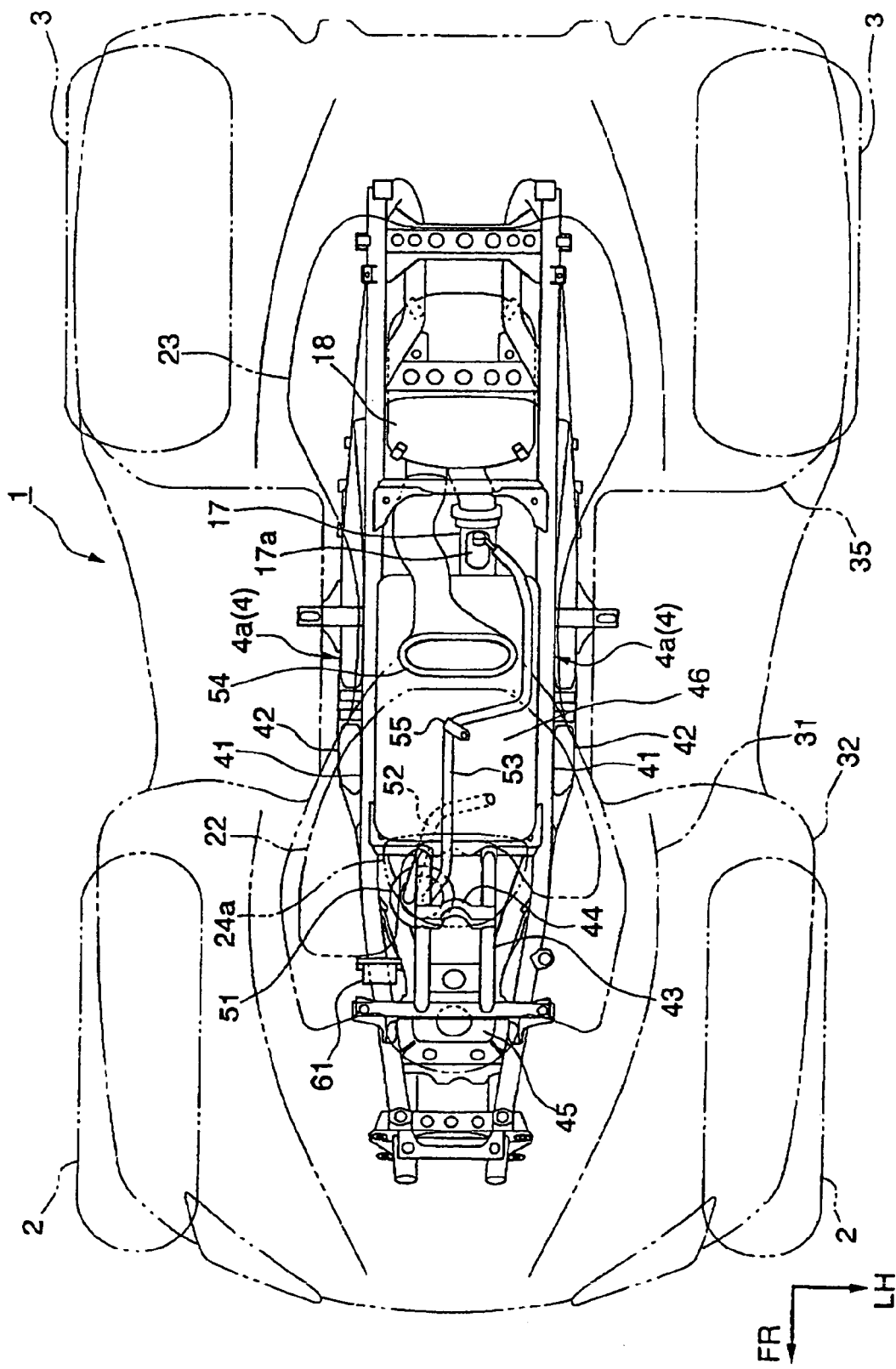
FIG. 2 is a top view of the saddle-ride type four-wheeled vehicle.
Figure 3:
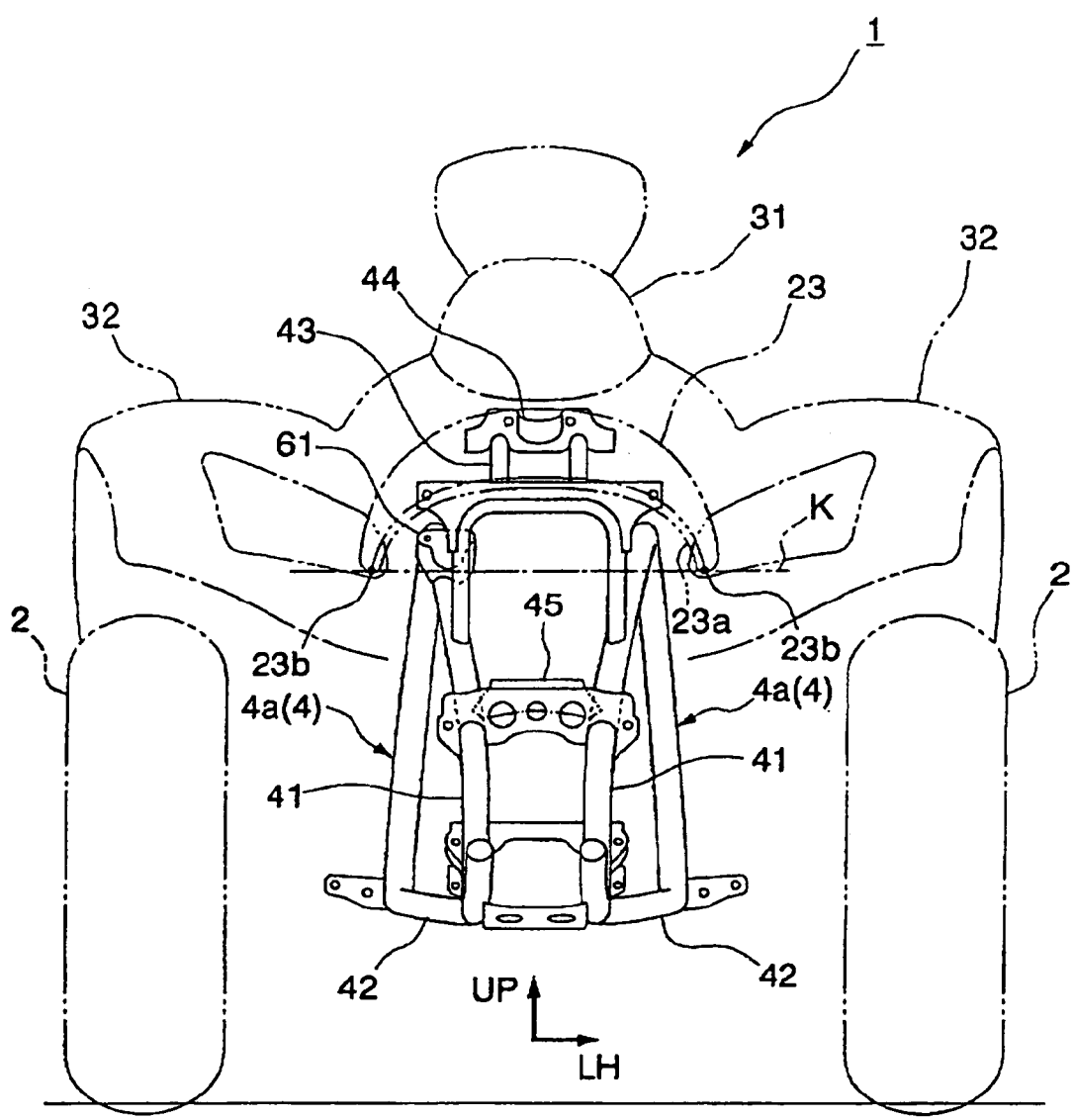
FIG. 3 is a front view of the saddle-ride type four-wheeled vehicle.

Further explanation will be given with reference to FIGS. 2 and 3. The vehicle body frame 4 has a pair of an upper pipe 41 and a lower pipe 42, extending nearly in the front and rear direction at the upper and lower parts thereof respectively. On each of the right and left sides, a pair of right and left closed-loop structures 4a are formed by properly bending and jointing the upper pipes 41 and lower pipes 42 with each other at the front and rear of the vehicle body. A box-shaped structure extending in the front and rear direction is formed in the center of the vehicle width by jointing both the closed-loop structures 4a with each other through plural cross members.

A derrick-shaped handle stem 43 protruding above the upper pipes 41 is disposed at the front part of the vehicle body. The upper part of the steering shaft 25 is supported by an upper support bracket 44 that is a cross member at the top of the handle stem 43 (the uppermost part of the vehicle body frame 4). Furthermore, the bottom end of the steering shaft 25 is supported by a lower support bracket 45 that is a cross member at the front part of the vehicle body frame 4.

Figure 4:
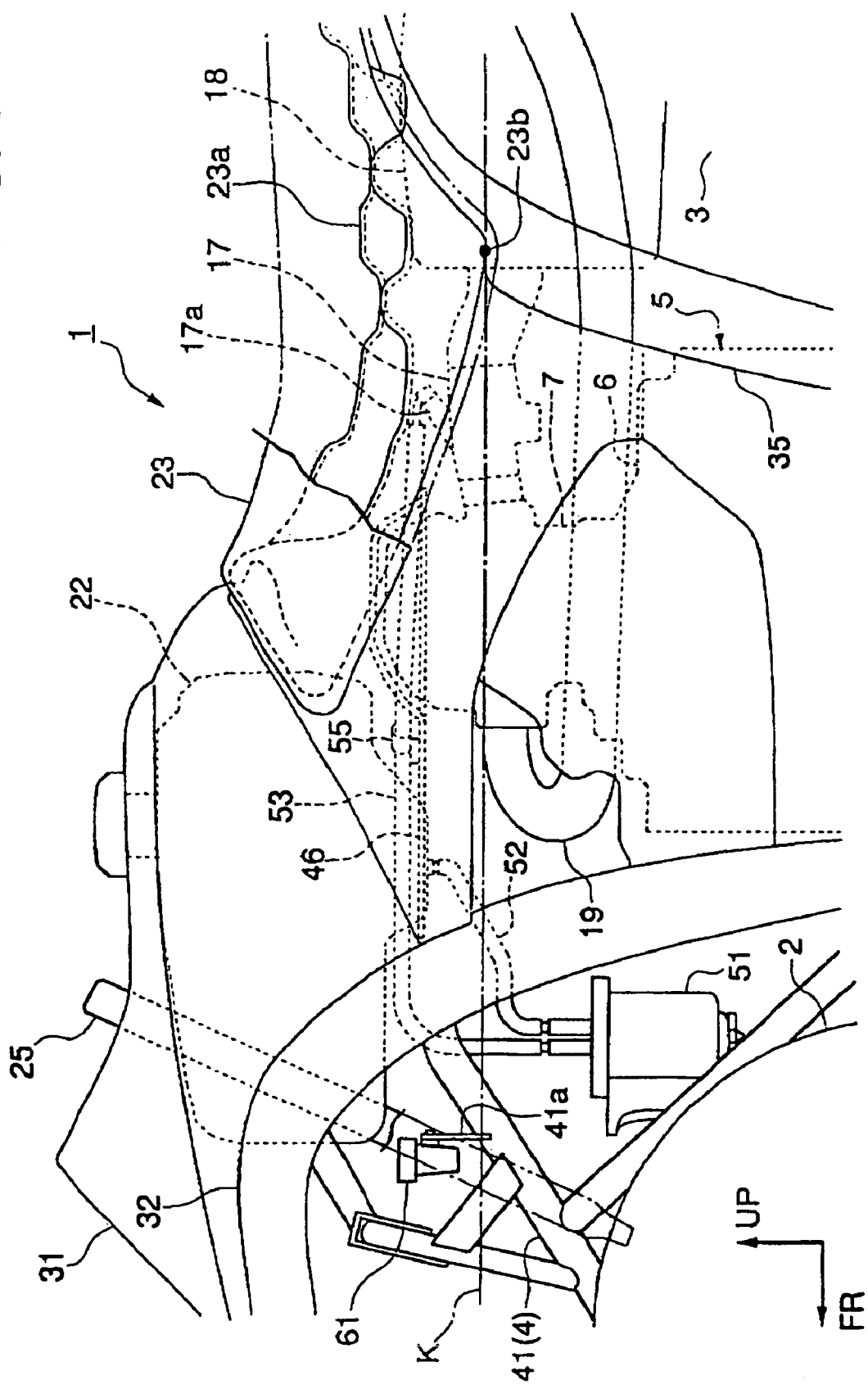
FIG. 4 is a side view showing a substantial part of FIG. 1.

Further explanation will be given with reference to FIG. 4. A heat shield cover 46 striding both the upper pipes 41 is disposed at the area extending from right under the rear part of the fuel tank 22 to right under the front part of the seat 23. Thus, the propagation of hot air coming from the engine 5 located under the fuel tank 22 and the seat 23 is suppressed.

The fuel tank 22 is, for example, an integrally molded component made of resin and the capacity thereof is secured by extending both sides of the front part forward so as to escape from the steering shaft 25 and others disposed immediately in front of the fuel tank 22. A fuel pump 51 is disposed under the front part of the fuel tank 22. A fuel inlet at the upper part of the fuel pump 51 and a fuel outlet at the bottom of the fuel tank 22 are connected to each other through a connecting pipe 52.

The fuel exhaust port of the fuel pump 51 and the injector 17a of the throttle body 17 are connected to each other through a fuel feed pipe 53. The fuel feed pipe 53 extends upward from the fuel exhaust port at the upper part of the fuel pump 51, bends rearward, is routed along the upper face of the heat shield cover 46 between the fuel tank 22 and the heat shield cover 46, and reaches the injector 17a.

In this case, the fuel feed pipe 53 is routed so as to form a crank shape in top view in order to escape from a snorkel 54 extending forward and obliquely upward from the air cleaner box 18 and opening at the inside of the front end of the seat 23. Reference numeral 55 in FIGS. 2 and 4 represents a clamp, which is fixed to the heat shield cover 46 and stipulates the route of the fuel feed pipe 53.

When the fuel pump 51 is activated, fuel sucked from the fuel tank 22 is pressurized up to a prescribed fuel pressure and thereafter fed to the injector 17a through the fuel feed pipe 53. The fuel is properly ejected by the operation of the injector 17a. The fuel is then supplied to the engine 5 together with external air introduced from the air cleaner box 18.

A lean sensor 61 that detects the leaning of a vehicle body when it reaches a prescribed angle is disposed on the right side of the front part of the vehicle body. The lean sensor 61 is supported by the vehicle body through a support bracket 41a fixed by welding to the upper pipe 41 on the right side. The lean sensor 61 is disposed at a position above the bottom ends 23b (both side parts of the seat 23 nearly in the center in the front and rear direction) of the baseplate 23a of the seat 23 (the level of the bottom ends 23b is shown by the line K in FIGS. 3 and 4) and overlapping with the steering shaft 25 in side view.

Figure 5:
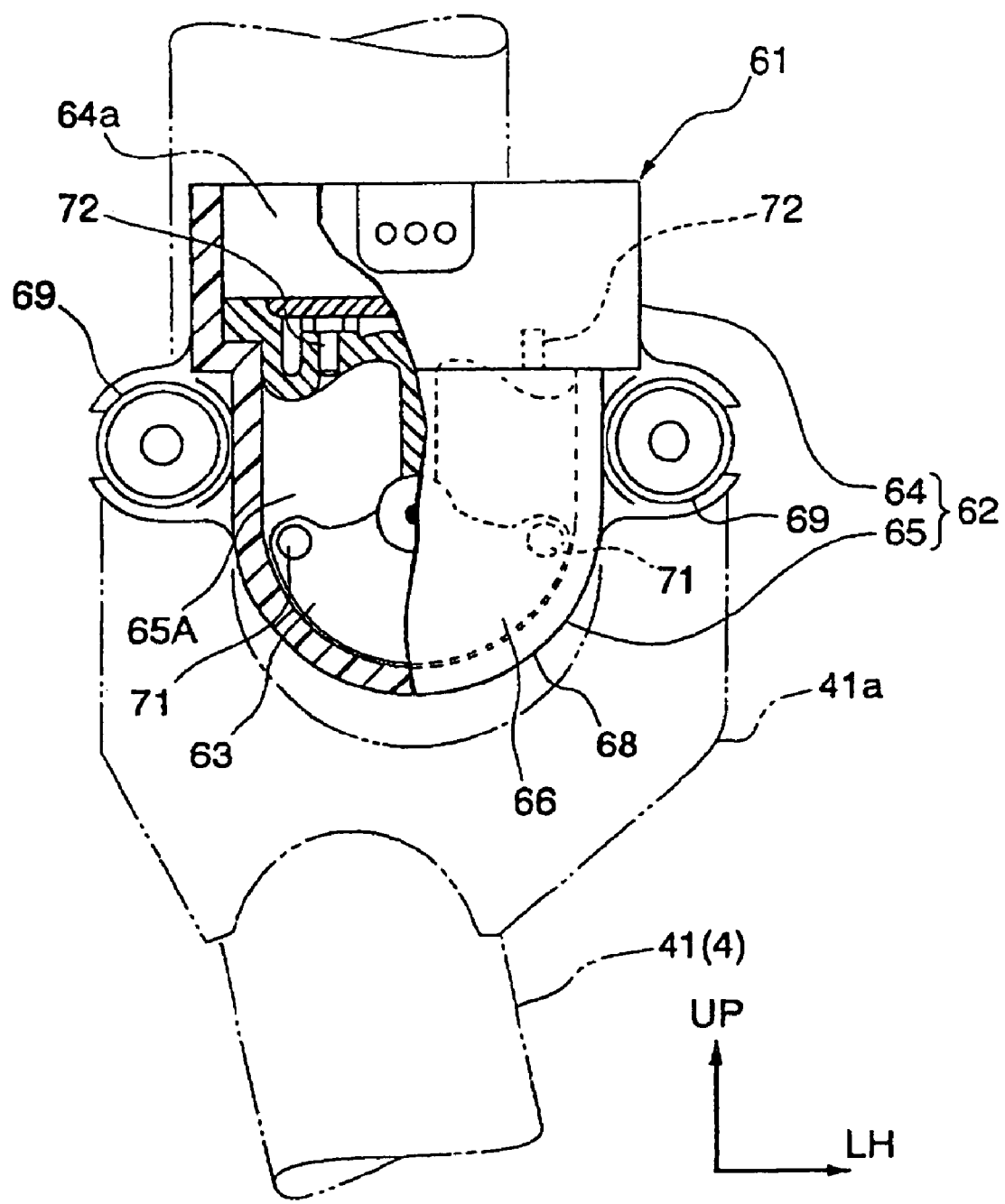
FIG. 5 is a front view of the lean sensor of the saddle-ride type four-wheeled vehicle.
Figure 6:
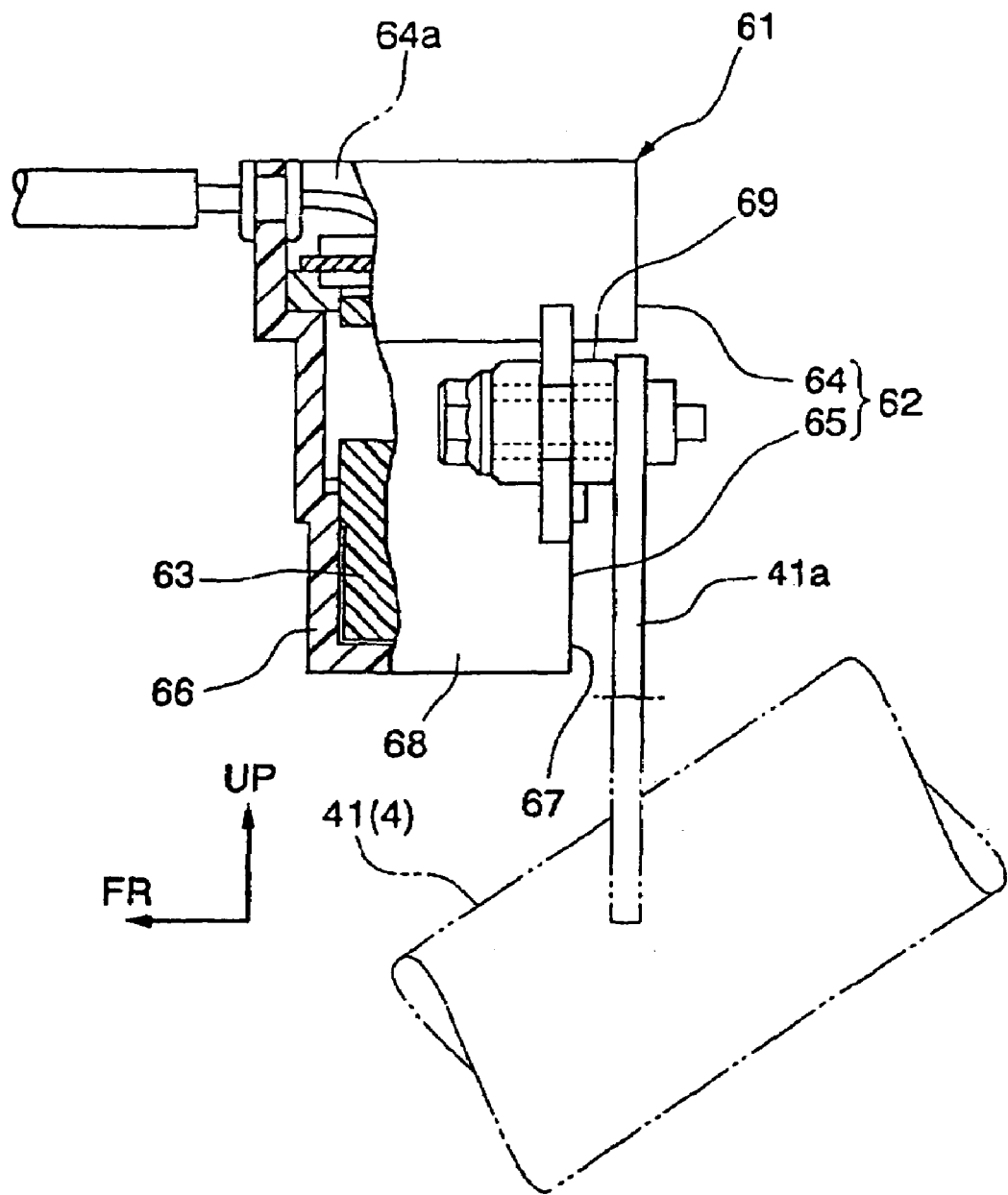
FIG. 6 is a side view of the lean sensor.

As shown in FIGS. 5 and 6, the lean sensor 61 is configured as an acceleration sensor having a float 63 as a pendulum in a casing 62 fixed to the vehicle body. The casing 62 contains a detection circuit 64a in a box section 64 composing the upper part of the casing 62 and also the float 63 in a space forming section 65 composing the lower part thereof.

The space forming section 65 is formed by being surrounded by front and rear wall sections 66 and 67 forming a U-shaped contour in elevation view (front view) and a circumferential wall 68 disposed along the outer edges of the front and rear wall sections 66 and 67. A space 65A having the contour of a U-shape in elevation view is formed in the interior thereof. Rubber mounts 69 to support it with a support bracket 41a of the vehicle body frame 4 are disposed at both sides of the casing 62.

The float 63: is swingably pivoted near the center of the interior of the space 65A in the casing 62. The float 63 has a semicircular shape nearly conforming to the shape of the tower part of the space 65A. The float 63 is designed so as to be swingable in the right and left directions along the arc of the circumferential wall 68. The space 65A is filled with damper oil to damp the swing of the float 63.

Magnets (magnet components) 71 are embedded in the right and left ends (both the swing ends) of the float 63 and magnetic sensors (detectors) 72 capable of detecting magnetism from the magnets 71 are disposed on the right and left sides of the top end of the space 65A. Thus, it is configured so that either of the magnetic sensors 72 detects the magnetism of either of the magnets 71 when it approaches the relevant magnetic sensor 72 and thereby detects that the float 63 has reached a prescribed swing angle.

The axis of the swing of the float 63 is set in parallel with the front and rear direction. By the adjustment of the center of gravity and the like, it is configured so that the float 63 swings not only when the vehicle body leans in the right or left direction but also when the vehicle body leans in the front-rear direction. The below explanation is given on the premise that the float 63 is positioned at the neutral position of the swing range in the space 65A when the vehicle body is in the state where the leaning thereof in the front and rear, right and left directions is zero degrees (in the upright state) and the force affecting the float 63 is gravity only.

In such a lean sensor 61, it is configured so that when the vehicle body leans in the front, rear, right or left direction, the float 63 swings in relation to the casing 62. When the swing has reached a prescribed angle and the detection circuit 64a judges that the leaning of the vehicle body has reached a prescribed angle, prescribed engine control (stop of ignition, stop of fuel injection, etc.) is carried out through an ECU (Electronic Control Unit) not shown in the figures.

In a saddle-ride type four-wheeled vehicle 1, the vehicle body is not banked unlike a motorcycle. Therefore, it sometimes happens that the float 63 of the lean sensor 61 swings due to the effect of centrifugal force and the like during turning travel even when the vehicle body is nearly upright. As a means for coping with such a situation, the detection angle (swing angle from the neutral position of the float) of the lean sensor 61 used for the saddle-ride type four-wheeled vehicle 1 is designed so as to be larger than the detection angle of a lean sensor used for a motorcycle.

Furthermore, in the lean sensor 61, delay time up to the time when the detection circuit 64a detects the lean angle of the vehicle body is prepared so as not to wrongly judge that the leaning of the vehicle body has reached a prescribed angle when the float 63 swings and reaches the detection angle on a temporary basis during turning of the saddle-ride type four-wheeled vehicle 1 or the like. The delay time is set so as to be longer than the time period during which the float 63 keeps sticking to the maximum swing position due to the centrifugal force during turning. Thereby, when the float 63 leans up to a prescribed angle for a prescribed time period, it is judged that the vehicle body leans up to a prescribed angle.

As explained above, the lean detector of the above embodiment is applied to a saddle-ride type four-wheeled vehicle 1 provided with: an engine 5 supported by a vehicle body frame 4. A steering shaft 25 is supported by the vehicle body frame 4 through a handle stem 43. A fuel tank 22 is above the engine 5. An air cleaner box 18 is provided to the rear of the engine 5. A fuel injector 17a is provided between the engine 5 and the air cleaner box 18. A seat 23 is provided to the rear of the fuel tank 22 and above the air cleaner box 18. A lean sensor 61 is also provided at a position above the bottom end of the baseplate 23a of the seat 23 to detect the leaning of the vehicle body.

With this configuration, the lean sensor 61 is hardly immersed even when traveling with the lower part of the vehicle body dipped in water. Hence, it is possible to decrease the cost of the part of the lean sensor 6, enhance the waterproof property thereof, and realize good engine control.

Furthermore, in the lean detector, the lean sensor 61 has a space 65A of a U-shaped contour and a swinging float 63 pivoted near the center of the interior of the space 65A. The lean sensor 61 is provided with magnets 71 at both the swing ends of the float 63 and magnetic sensors 72 to detect that the magnets 71, together with the float 63, have swung up to a prescribed detection angle at the end of the space 65A. When the float 63 swings up to the detection angle for a prescribed time period, lean sensor 61 detects that the leaning of the vehicle body is at a prescribed angle.

With this configuration, in a saddle-ride type four-wheeled vehicle 1 which does not bank the vehicle body during turning, even when the float 63 swings temporarily up to the aforementioned detection angle by centrifugal force during turning travel or the like, it is possible to prevent the lean sensor 61 from wrongly judging the leaning of the vehicle body; and realize good engine control.

Furthermore, even though the lean sensor 61 is a sensor that detects the leaning of the vehicle body in the right and left directions, when the vehicle body leans in the front-rear direction, the float 63 swings in either the right or left direction. Hence, when the swing reaches the aforementioned detection angle for a prescribed time period, it is possible to detect that the leaning of the vehicle body in the front-rear direction is at a prescribed angle and carry out the engine control broadly conforming to the leaning of the vehicle body.

Furthermore, in the lean detector, the saddle-ride type four-wheeled vehicle 1 is a rough terrain traveling four-wheeled vehicle. The prescribed time period is set at a time period longer than the time period during which the float 63 reaches the detection angle during turning of the saddle-ride type four-wheeled vehicle 1. Thereby, in the rough terrain traveling four-wheeled vehicle that does not bank the vehicle body even during turning, even when the float 63 of the lean sensor 61 swings temporarily up to the aforementioned detection angle by the centrifugal force during the turning, it is possible to prevent the wrong judgment that the leaning angle of the vehicle body has reached a prescribed angle.

Figure 7:
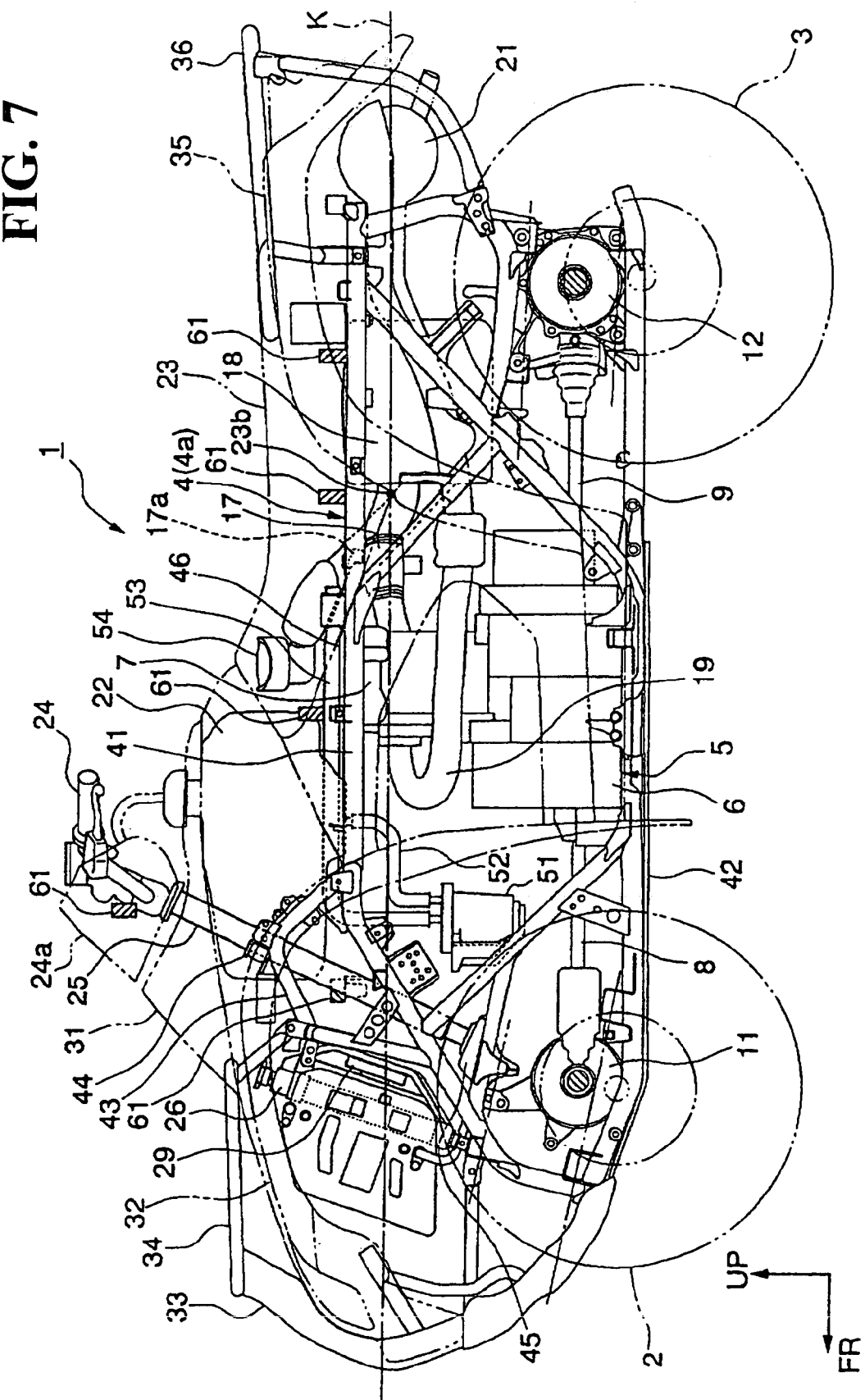
FIG. 7 is a side view showing a modified example of the placement of the lean sensor in the same way as FIG. 1.
Figure 8:
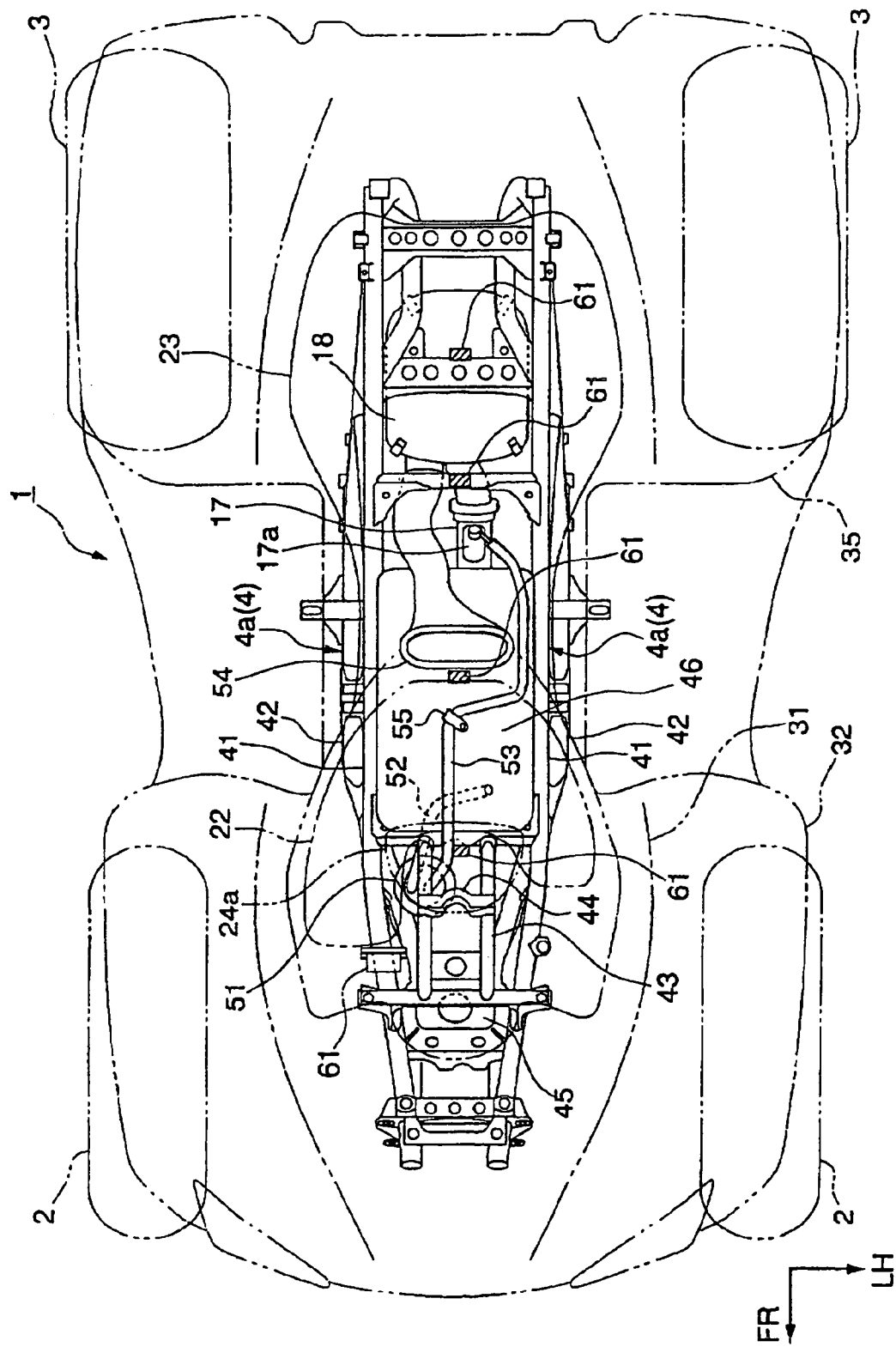
FIG. 8 is a top view showing a modified example of the placement of the lean sensor in the same way as FIG. 2.

It should be noted that the present invention is not limited to the aforementioned embodiment and, as shown in FIGS. 7 and 8 for example, the lean sensor 61 may be disposed at any location of the vehicle body (for example, between the fuel tank 22 and the seat 23, on the vehicle body frame 4 at the rear of the seat 23, inside the handle cover 24*a*, or other locations) as long as the location is above the bottom end of the baseplate 23*a* of the seat 23 (above the line K).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A lean detector for a vehicle, the vehicle including an engine supported by a vehicle body frame, a steering shaft supported by the vehicle body frame through a handle stem, a fuel tank above the engine, an air cleaner box to a rear of the engine, a fuel injector between the engine and the air cleaner box, and a seat to a rear of the fuel tank and above the air cleaner box,
    wherein said lean detector detects leaning of the vehicle body, said lean detector being disposed at a position above a bottom end of a baseplate of the seat and overlapping with the steering shaft in side view.

2. The lean detector for a vehicle according to claim 1, wherein said lean detector further comprises:
    a space formed therein and having of a U-shaped contour;
    a swinging float, said swinging float being mounted to pivot near the center of said space, said swinging float being provided with magnet components at opposite ends thereof; and
    detection sections to detect that said magnet components, together with said swinging float, have swung up to a prescribed detection angle at ends of said space,
    wherein when said swinging float swings up to the predetermined detection angle for a prescribed time period, said lean sensor detects that the leaning of the vehicle body is at a prescribed angle.

3. The lean detector for a vehicle according to claim 2, wherein the vehicle is a rough terrain traveling four-wheeled vehicle, and the prescribed time period is set at a time period longer than a time period during which said swinging float reaches the predetermined detection angle during turning of the rough terrain traveling four-wheeled vehicle.

4. The lean detector for a vehicle according to claim 1, wherein said lean detector is an acceleration sensor that has a float in the form of a pendulum that is detected by a detection circuit when the vehicle body leans to a prescribed angle for a prescribed period of time.

5. The lean detector for a vehicle according to claim 1, further comprising:
    a casing, said casing forming a space therein; and
    a float, said float being swingably mounted within said space, said float including first and second opposed ends;
    first and second sensors mounted within said casing,
    wherein said first and second sensors respectively detect said first and second opposed ends of said float when said float swings to a prescribed angle.

6. The lean detector for a vehicle according to claim 5, wherein said first and second ends include magnets attached thereto, and said first and second sensors are magnetic sensors.

7. The lean detector for a vehicle according to claim 5, wherein said space is generally U-shaped, and said float has a semicircular shape generally corresponding to a shape of a lower part of said space.

8. The lean detector for a vehicle according to claim 5, wherein said space is filled with damper oil to damp the swinging of said float.

9. The lean detector for a vehicle according to claim 1, wherein a swing axis of said float is parallel to a front, rear direction of the vehicle body, said float being configured to swing in a right or left direction of the vehicle body when the vehicle body is tilted in the right or left direction and when the vehicle body is tilted in the front or rear direction of the vehicle body.

10. The lean detector for a vehicle according to claim 1, wherein the lean detector is located within a space defined by the baseplate of the seat in rear view.

11. A lean detector for a vehicle that detects leaning of a vehicle body of the vehicle, comprising:
    a casing, said casing supporting the lean detector therein and being mounted to the vehicle body at a position above a bottom end of a baseplate of a seat of the vehicle and overlapping with a steering shaft of the vehicle in side view.

12. The lean detector for a vehicle according to claim 11, wherein said lean detector further comprises:
    a space formed within said casing and having of a U-shaped contour;
    a swinging float, said swinging float being mounted to pivot near the center of said space, said swinging float being provided with magnet components at opposite ends thereof; and
    detection sections to detect that said magnet components, together with said swinging float, have swung up to a prescribed detection angle at ends of said space,
    wherein when said swinging float swings up to the predetermined detection angle for a prescribed time period, said lean sensor detects that the leaning of the vehicle body is at a prescribed angle.

13. The lean detector for a vehicle according to claim 12, wherein the vehicle is a rough terrain traveling four-wheeled vehicle, and the prescribed time period is set at a time period longer than a time period during which said swinging float reaches the predetermined detection angle during turning of the rough terrain traveling four-wheeled vehicle.

14. The lean detector for a vehicle according to claim 11, wherein said lean detector is an acceleration sensor that has a float in the form of a pendulum that is detected by a detection circuit when the vehicle body leans to a prescribed angle for a prescribed period of time.

15. The lean detector for a vehicle according to claim 11, further comprising:
   a float, said float being swingably mounted within a space formed within said casing, said float including first and second opposed ends;
   first and second sensors mounted within said casing,
   wherein said first and second sensors respectively detect said first and second opposed ends of said float when said float swings to a prescribed angle.

16. The lean detector for a vehicle according to claim 15, wherein said first and second ends include magnets attached thereto, and said first and second sensors are magnetic sensors.

17. The lean detector for a vehicle according to claim 15, wherein said space is generally U-shaped, and said float has a semicircular shape generally corresponding to a shape of a lower part of said space.

18. The lean detector for a vehicle according to claim 15, wherein said space is filled with damper oil to damp the swinging of said float.

19. The lean detector for a vehicle according to claim 11, wherein a swing axis of said float is parallel to a front, rear direction of the vehicle body, said float being configured to swing in a right or left direction of the vehicle body when the vehicle body is tilted in the right or left direction and when the vehicle body is tilted in the front or rear direction of the vehicle body.

20. The lean detector for a vehicle according to claim 11, wherein the lean detector is located within a space defined by the baseplate of the seat in rear view.

* * * * *